(12) United States Patent
Currey et al.

(10) Patent No.: US 10,889,064 B1
(45) Date of Patent: Jan. 12, 2021

(54) PROCESS FOR LASER WELDING OF CROSSLINKED POLYETHYLENE

(71) Applicant: Mercury Plastics LLC, Middlefield, OH (US)

(72) Inventors: Donald Currey, Chagrin Falls, OH (US); Scott R. Gardner, Chagrin Falls, OH (US); William Blue, Middlefield, OH (US)

(73) Assignee: Mercury Plastics LLC, Middlefield, OH (US)

( * ) Notice: Subject to any disclaimer, the term of this patent is extended or adjusted under 35 U.S.C. 154(b) by 242 days.

(21) Appl. No.: 15/963,914

(22) Filed: Apr. 26, 2018

Related U.S. Application Data (60) Provisional application No. 62/490,283, filed on Apr. 26, 2017.

(51) Int. Cl.

| | |
|---|---|
| *B29C 65/16* | (2006.01) |
| *B23K 26/00* | (2014.01) |
| *B23K 26/282* | (2014.01) |
| *B29C 65/00* | (2006.01) |
| B29L 23/00 | (2006.01) |
| B29K 623/00 | (2006.01) |

(52) U.S. Cl.
CPC ...... *B29C 65/1638* (2013.01); *B23K 26/0006* (2013.01); *B23K 26/282* (2015.10); *B29C 66/612* (2013.01); *B29C 66/71* (2013.01); B29K 2623/0691 (2013.01); B29L 2023/22 (2013.01)

(58) Field of Classification Search
CPC ... B29C 65/16; B29C 65/1638; B23K 26/282; B23K 26/0006; B23K 66/612; B23K 66/71
See application file for complete search history.

(56) References Cited

U.S. PATENT DOCUMENTS

| | | | |
|---|---|---|---|
| 3,769,117 A * | 10/1973 | Bowen | B29C 65/1661 156/69 |
| 4,661,305 A * | 4/1987 | Carlomagno | B29C 66/91218 156/277 |
| 7,744,804 B2 | 6/2010 | Nakagawa et al. | |
| 8,366,860 B2 | 2/2013 | Daly et al. | |
| 8,505,604 B2 | 8/2013 | Stauffer et al. | |
| 8,778,120 B2 | 7/2014 | Kreischer et al. | |
| 9,393,738 B2 | 7/2016 | Kugelmann et al. | |
| 2003/0102671 A1 * | 6/2003 | Fritze | F16L 47/02 285/423 |
| 2004/0140668 A1 | 7/2004 | Monsheimer et al. | |
| 2005/0251986 A1 | 11/2005 | Katayama et al. | |
| 2008/0286532 A1 * | 11/2008 | Ando | B29C 65/1616 428/172 |

(Continued)

FOREIGN PATENT DOCUMENTS

| | | | | |
|---|---|---|---|---|
| CN | 206055023 U | * | 3/2017 | ............ F16L 47/02 |
| JP | 2009143149 A | * | 7/2009 | ......... B29C 66/7392 |

OTHER PUBLICATIONS

Translation of JP-2009143149-A (Year: 2009).*

*Primary Examiner* — Daniel McNally
(74) *Attorney, Agent, or Firm* — Hahn Loeser & Parks LLP; Daniel J. Smola (57) ABSTRACT

Examples herein relate generally to methods, and associated components, characterized by the laser welding of crosslinked polyethylene plumbing components so as to create a leak-proof connection with both mechanical and thermal fusion bonds.

20 Claims, 8 Drawing Sheets

(56) References Cited

U.S. PATENT DOCUMENTS

| | | |
|---|---|---|
| 2011/0074145 A1 | 3/2011 | Schwarzkopf et al. |
| 2011/0143069 A1 | 6/2011 | Blivet |
| 2014/0216648 A1 | 8/2014 | Geiger et al. |
| 2015/0174883 A1 | 6/2015 | Han |
| 2015/0292664 A1* | 10/2015 | Mann ...................... F16L 47/18 285/179 |
| 2015/0330541 A1 | 11/2015 | McCoy |
| 2016/0059475 A1 | 3/2016 | Brock-Nannestad et al. |
| 2017/0211727 A1* | 7/2017 | Peng ...................... F16L 33/34 |

* cited by examiner

PROCESS FOR LASER WELDING OF CROSSLINKED POLYETHYLENE

This application claims priority to, and the benefit of, U.S. Provisional Application No. 62/490,283 filed on Apr. 26, 2017 with the United States Patent Office, which is hereby incorporated by reference.

BACKGROUND

Crosslinked polyethylene (PEX) tubing is widely used throughout the plumbing industry. However, attaching PEX tubing to a PEX fitting has traditionally only been achieved by mechanical means, such as crimp fittings, expansion fittings, and O-ring connections. Joining PEX tubing to PEX end fittings by a welding process would be preferable, as it would provide a more permanent, leak-proof, connection. Unfortunately, traditional thermal welding methods, such as fusion welding, which are typically used to join tubes and fittings, does not work with PEX materials. This is due to the fact that the crosslinking of polyethylene creates a material which is mostly thermoset and, unlike a non-crosslinked thermoplastic material, will not adequately melt when heated, and thus fails to create a reliable thermal fusion bond. Specifically, traditional thermal welding methods, where the fitting and tube are separately heated and partially melted prior to assembly, does not provide rigid enough workpieces to allow for the assembling of a press-fit type connection between the components. Similarly, heating an assembled fitting and tube using conventional thermal welding methods tends to melt only the outer PEX component, rather than allowing for the creation of a leak-proof thermal fusion bond where both the fitting and tubing are in contact and have each partially melted together.

The present invention solves these problems through the application of laser welding methods, also called through transmission welding, which uses a laser having an infrared wavelength to heat component parts.

SUMMARY OF THE INVENTION

The invention described herein relates to a process for laser welding crosslinked polyethylene components used in a wide variety of plumbing systems.

In one embodiment, a process for laser welding crosslinked polyethylene components may comprise one or more of the following steps: 1) providing a transmissive crosslinked polyethylene component and an absorptive crosslinked polyethylene component; 2) expanding an end of the transmissive crosslinked polyethylene component; 3) inserting an end of the absorptive crosslinked polyethylene component into the expanded end of transmissive crosslinked polyethylene component; 4) contracting the expanded end of the transmissive crosslinked polyethylene component using shape memory to form a compressive contact with the end of the absorptive crosslinked polyethylene component; and 5) directing a laser beam through the transmissive crosslinked polyethylene component onto an outer surface of the absorptive crosslinked polyethylene component, wherein the step of contracting the expanded end of the transmissive crosslinked polyethylene component using shape memory creates a mechanical bond between the transmissive crosslinked polyethylene component and the absorptive crosslinked polyethylene component, and the step of directing a laser beam creates a thermal fusion bond between the transmissive crosslinked polyethylene component and the absorptive crosslinked polyethylene component.

In another embodiment, a process for laser welding polyethylene components may comprise one or more of the following steps: 1) providing a transmissive polyethylene component and an absorptive polyethylene component; 2) expanding an end of the transmissive polyethylene component; 3) inserting an end of the absorptive component into the expanded end of the transmissive polyethylene component; contracting the expanded end of the transmissive polyethylene component using shape memory to form a compressive contact with the end of the absorptive component; 4) directing a laser beam through the transmissive polyethylene component onto an outer surface of the absorptive polyethylene component; and 5) crosslinking the transmissive polyethylene component and the absorptive polyethylene component, wherein the step of contracting the expanded end of the transmissive component using shape memory creates a mechanical bond between the transmissive polyethylene component and the absorptive component, wherein the step of directing a laser beam creates a thermal fusion bond between the transmissive component and the absorptive component.

The advantages of these inventive methods, and products, are—at least—laser welded crosslinked polyethylene plumbing components with leak-proof connections attributable to both mechanical and thermal fusion bonds.

The foregoing and other objects, features, and advantages of the examples will be apparent from the following more detailed descriptions of particular examples, as illustrated in the accompanying drawings wherein like reference numbers represent like parts of the examples.

BRIEF DESCRIPTION OF THE DRAWINGS

Reference is made to the accompanying drawings in which particular examples and further benefits of the examples are illustrated as described in more detail in the description below, in which.

DETAILED DESCRIPTION OF THE INVENTION

In the inventive methods and associated components disclosed herein, polyethylene components, including crosslinked polyethylene (PEX) components, are laser welded to provide a leak proof connection characterized by a thermal fusion bond. In certain embodiments, the polyethylene and/or PEX components are provided with both a mechanical bond and thermal fusion bond.

Crosslinked polyethylene, also known as PEX, contains crosslinked bonds in the polymer structure changing the thermoplastic into a thermoset. Crosslinking may be accomplished during or after extrusion depending on the method of crosslinking. According to ASTM Standard F 876, the degree of crosslinking of polyethylene tubing is between 65-89%. However, the present process contemplates that the components may be partially crosslinked as set forth herein. There are three classifications of PEX, referred to as PEX-A, PEX-B, and PEX-C. PEX-A is made by peroxide (Engel) method. In the PEX-A method, peroxide blending with the polymer performs crosslinking above the crystal melting temperature. The polymer is typically kept at high temperature and pressure for long periods of time during the extrusion process. PEX-B is formed by the silane method, also referred to as the "moisture cure" method. In the PEX-B method, silane blended with the polymer induces crosslinking during secondary post-extrusion processes, producing crosslinks between a crosslinking agent. The process is accelerated with heat and moisture. The crosslinked bonds are formed through silanol condensation between two grafted vinyltrimethoxysilane units. PEX-C is produced by application of an electron beam using high energy electrons to split the carbon-hydrogen bonds and facilitate crosslinking.

Crosslinking imparts shape memory properties to polymers. Shape memory materials have the ability to return from a deformed state (e.g. temporary shape) to their original crosslinked shape (e.g. permanent shape), typically induced by an external stimulus or trigger, such as a temperature change. Alternatively or in addition to temperature, shape memory effects can be triggered by an electric field, magnetic field, light, or a change in pH, or even the passage of time. Shape memory polymers include thermoplastic and thermoset (covalently crosslinked) polymeric materials.

A chemical crosslinked network may be formed by low doses of irradiation. Polyethylene chains are oriented upon the application of mechanical stress above the melting temperature of polyethylene crystallites, which can be in the range between 60° C. and 130° C. Materials that are most often used for the production of shape memory linear polymers by ionizing radiation include high density polyethylene, low density polyethylene and copolymers of polyethylene and poly(vinyl acetate). After shaping, for example, by extrusion or compression molding, the polymer is covalently crosslinked by means of ionizing radiation, for example, by highly accelerated electrons. The energy and dose of the radiation are adjusted to the geometry of the sample to reach a sufficiently high degree of crosslinking, and hence sufficient fixation of the permanent shape.

Another example of chemical crosslinking includes heating poly(vinyl chloride) under a vacuum resulting in the elimination of hydrogen chloride in a thermal dehydrocholorination reaction. The material can be subsequently crosslinked in an HCl atmosphere. The polymer network obtained shows a shape memory effect. Yet another example is crosslinked poly[ethylene-co-(vinyl acetate)] produced by treating the radical initiator dicumyl peroxide with linear poly[ethylene-co-(vinyl acetate)] in a thermally induced crosslinking process. Materials with different degrees of crosslinking are obtained depending on the initiator concentration, the crosslinking temperature and the curing time. Covalently crosslinked copolymers made form stearyl acrylate, methacrylate, and N,N'-methylenebisacrylamide as a crosslinker.

Additionally shape memory polymers include polyurethanes, polyurethanes with ionic or mesogenic components, block copolymers consisting of polyethyleneterephthalate and polyethyleneoxide, block copolymers containing polystyrene and poly(1,4-butadiene), and an ABA triblock copolymer made from poly(2-methyl-2-oxazoline) and a poly (tetrahydrofuran). Further examples include block copolymers made of polyethylene terephthalate and polyethylene oxide, block copolymers made of polystyrene and poly(1,4-butadiene) as well as ABA triblock copolymers made from poly(tetrahydrofuran) and poly(2-methyl-2-oxazoline). Other thermoplastic polymers which exhibit shape memory characteristics include polynorbornene, and polyethylene grated with nylon-6 that has been produced for example, in a reactive blending process of polyethylene with nylon-6 by adding maleic anhydride and dicumyl peroxide.

In the inventive laser welding process, a laser is directed through the surface of a transmissive first component, which may be either a tube or fitting that is molded or extruded from, or otherwise includes, a transmissive material that makes the component transmissive to the infrared laser. The transmissive component may be transparent, translucent or include any material that makes the component transmissive to the infrared laser. For example, standard polyethylene is a transmissive material. A second, underlying, component is molded or extruded from a material containing carbon black or other known absorptive compounds, which renders it absorptive to the infrared laser. The absorptive component is at least partially assembled within a portion of the transmissive component, and may be in compressed contact with the transmissive component. When the laser, having been transmitted through the transmissive component, reaches the surface of the underlying absorptive component, it heats the surface of the absorptive component and partially melts the surface of the absorptive component, which in turn partially melts the adjoining surface of the transmissive component, thereby creating a leak-proof thermal fusion bond between the two components.

In certain embodiments, this process may additionally provide the laser welded PEX components with a mechanical—i.e., compressive, hoop stress, press-fit—connection without use of the traditional crimp fittings, expansion fittings, and O-ring connections. In order to provide the compressive contact required by this process, the unique shape memory property of PEX material is utilized. When PEX is stressed or stretched, it will try to return to its original shape or the shape in which it was crosslinked. Therefore, when a cylindrical PEX shape is expanded diametrically, it will exert constant hoop stress on the cylindrical mandrel used to expand the PEX cylinder. It is this PEX property that, during assembly of PEX components, is used to keep the outer transmissive cylindrical component in compressive contact with the inner absorptive cylindrical component, thus providing the conditions required to thermally bond the two component surfaces. Alternatively, the outer transmissive cylindrical component may be expanded diametrically by the inner absorptive cylindrical component itself.

Figure 1:
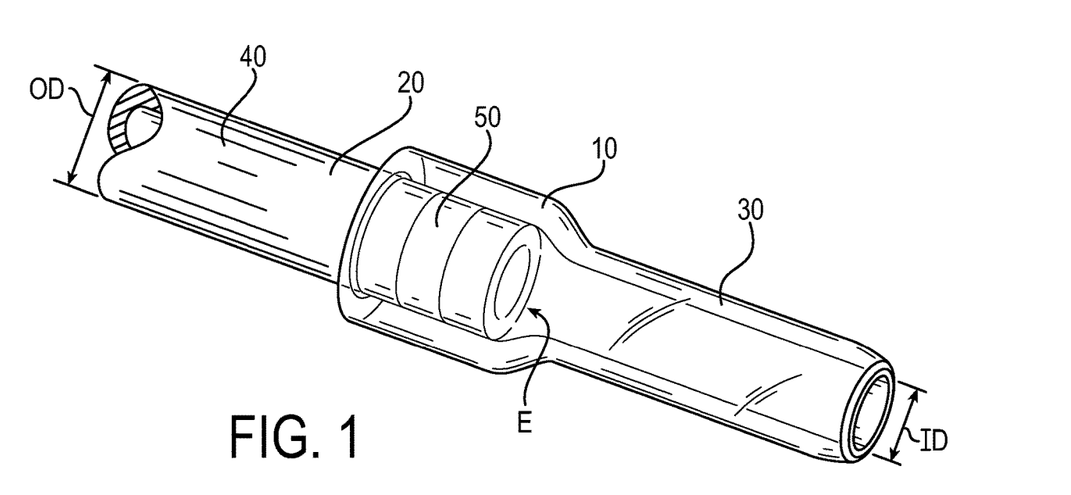
FIG. 1 is a perspective view of a laser welded absorptive tube and transmissive fitting, in accordance with an example of the laser welding process.
Figure 2:
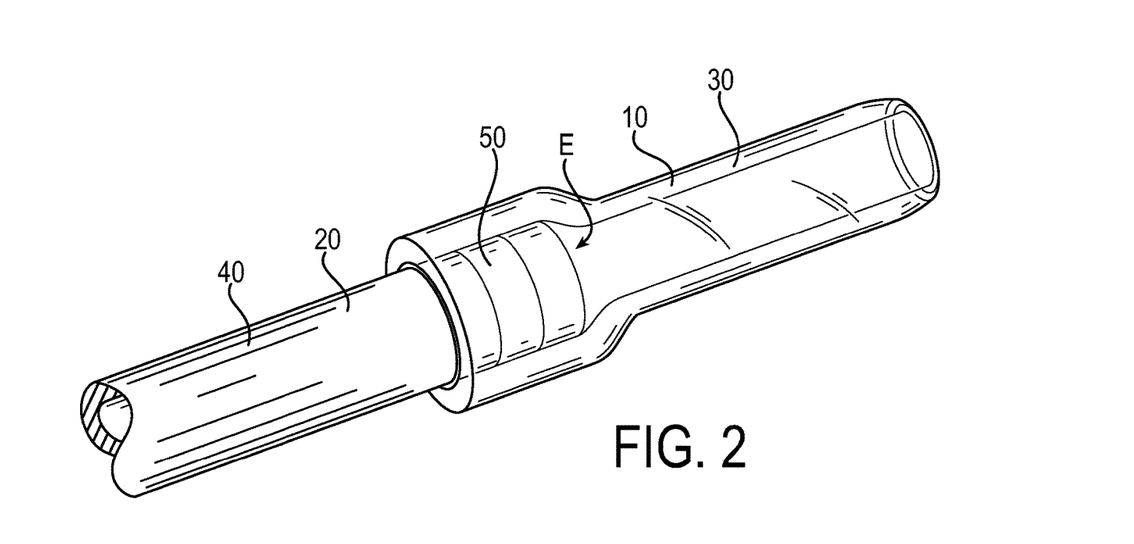
FIG. 2 is another perspective view of a laser welded absorptive tube and transmissive fitting, in accordance with an example of the laser welding process.
Figure 7:
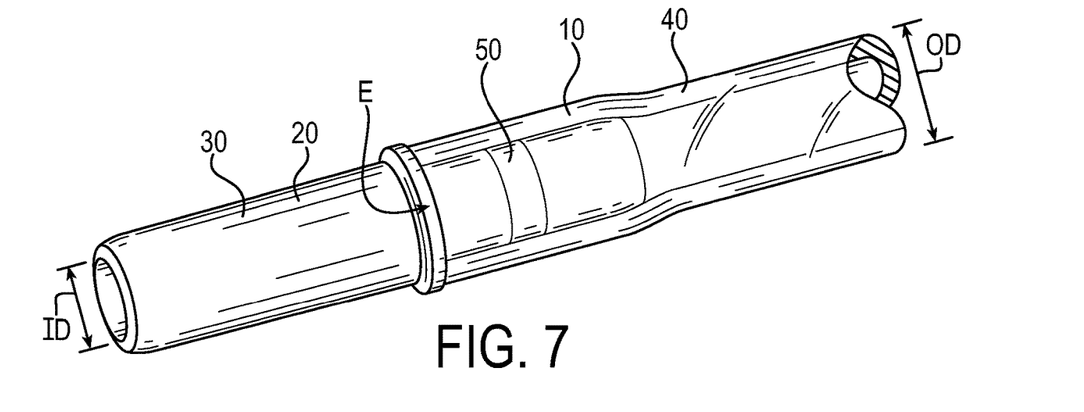
FIG. 7 is a perspective view of a laser welded absorptive fitting and transmissive tube, in accordance with an example of the laser welding process.
Figure 8:
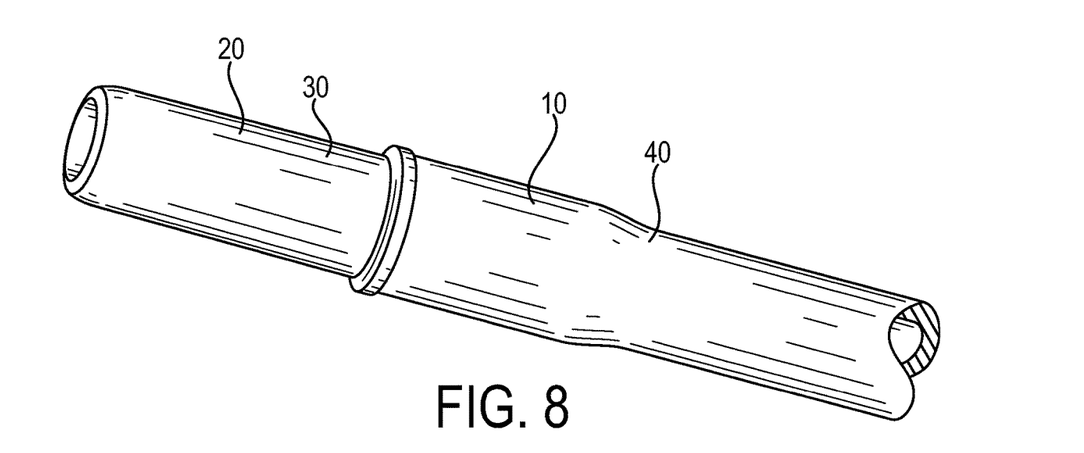
FIG. 8 is a perspective view of a laser welded absorptive fitting and transmissive tube, in accordance with an example of the laser welding process.
Figure 11:
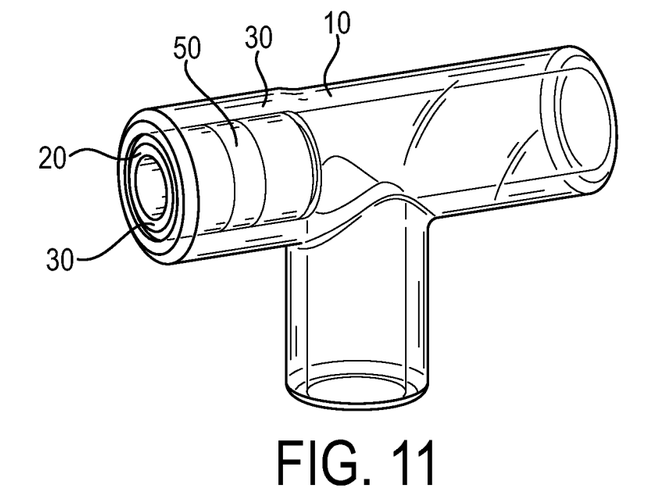
FIG. 11 is a perspective view of a laser welded absorptive fitting and transmissive fitting, in accordance with an example of the laser welding process.
Figure 12:
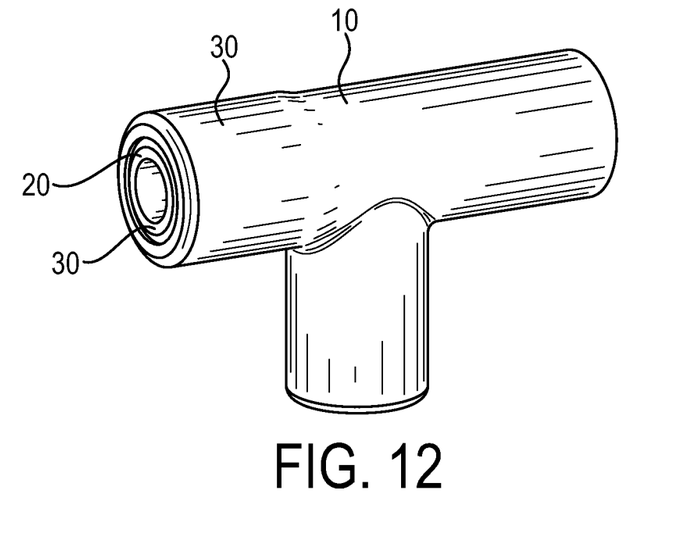
FIG. 12 is a perspective view of a laser welded absorptive fitting and transmissive fitting, in accordance with an example of the laser welding process.

The inventive process and components are best illustrated with reference to the FIGURES. In one example (shown in FIGS. 1, 2, 3, 4 and 13), the transmissive component 10 is a fitting 30 that is at least partially assembled over an outside diameter (OD) of an absorptive component 20 comprising a tube 40. The fitting 30 may be molded to its desired shape from non-colored polyethylene, which is a transmissive material, and imparts the component with its laser transmissive properties. The fitting 30 shown in FIG. 1 is a straight fitting, but may also comprise a valve, a diverter, a manifold, a fixture, a 90 degree fitting (FIGS. 3 and 4), a T connector (FIGS. 11 and 12), a Y connector, or other plumbing or appliance connection known in the art or shown in the FIGURES (i.e., FIGS. 7 and 8). The absorptive component 20 may be a tube 40 that is formed by extrusion from polyethylene, and includes carbon black added to the polyethylene prior to extrusion to create an absorptive material which is not transmissive.

In various embodiments, the transmissive component 10 and the absorptive component 20 (i.e. the fitting 30 and the tube 40) may be separately crosslinked to form PEX before laser welding. The transmissive component 10 and absorptive component 20 may be crosslinked to the same, or different percentages, to optimize the thermoset and/or shape memory properties necessary for the creation of a mechanical bond and a thermal fusion bond between the two components during the laser welding process. By way of non-limiting examples, one or more of the transmissive component 10 and/or absorptive component 20 may be crosslinked between 20% and 40%, between 41% and 60%, between 61% and 65%, between 66% and 89%, and/or between 90% and 99% in order to optimize the creation of a thermal fusion bond between the two components during the laser welding process. In one embodiment, the absorptive component is crosslinked to a greater percentage than the transmissive component. In one example, the absorptive component is crosslinked between 50-70%, while the transmissive component is crosslinked between 40-60%, where the absorptive component has a higher crosslinking percentage than the transmissive component. In still other embodiments, the polyethylene materials are laser welded prior to crosslinking.

Figure 3:
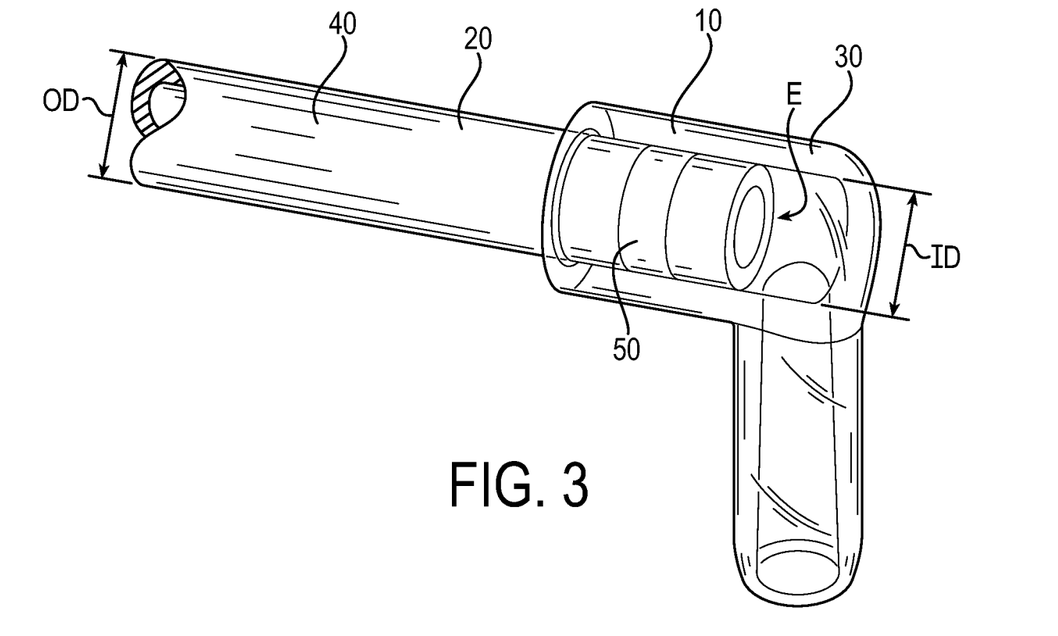
FIG. 3 is a perspective view of a laser welded absorptive tube and 90 degree transmissive fitting, in accordance with an example of the laser welding process.
Figure 4:
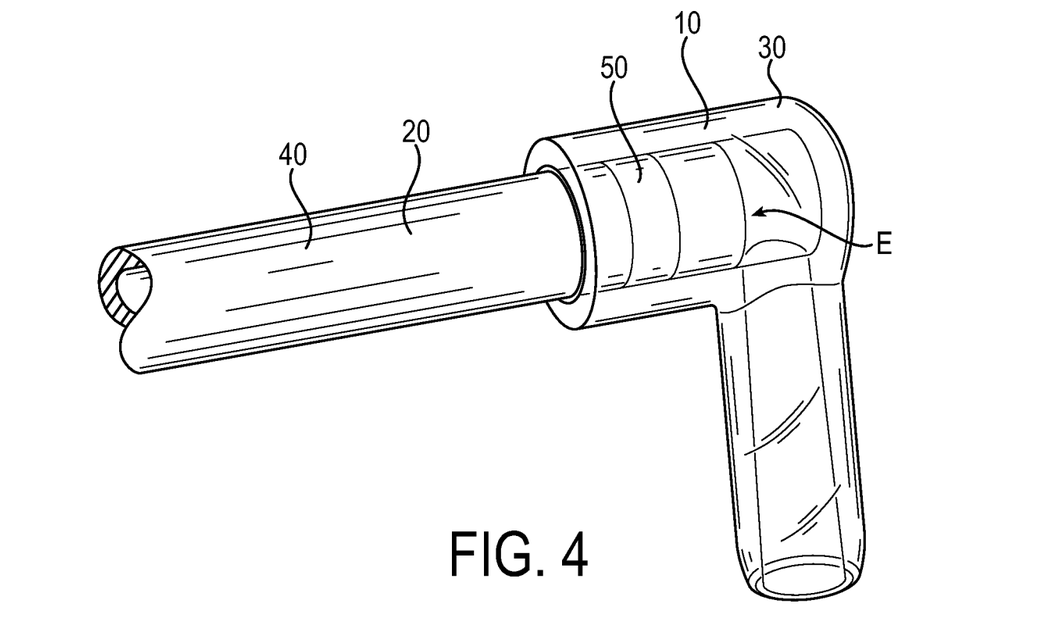
FIG. 4 is another perspective view of a laser welded absorptive tube and 90 degree transmissive fitting, in accordance with an example of the laser welding process.
Figure 5:
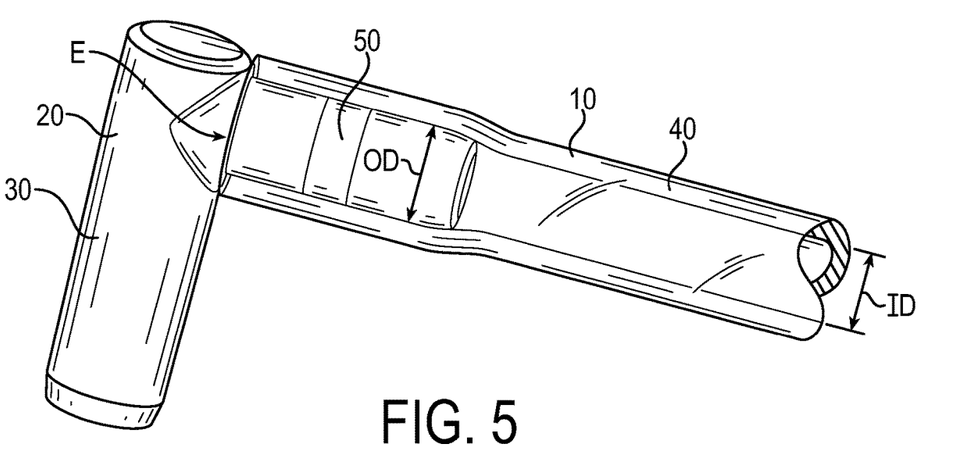
FIG. 5 is a perspective view of a laser welded 90 degree absorptive fitting and transmissive tube, in accordance with an example of the laser welding process.
Figure 6:
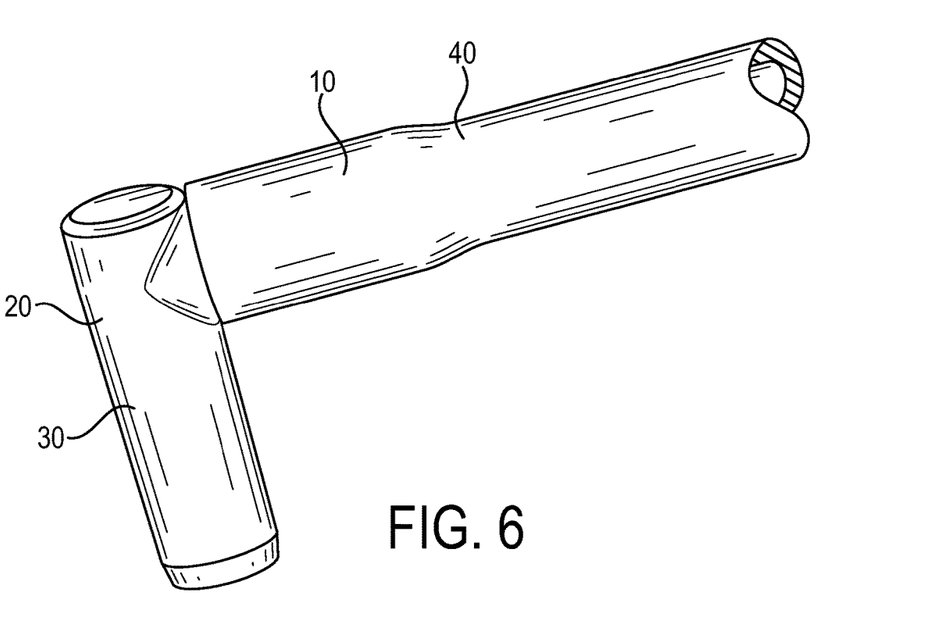
FIG. 6 is another perspective view of a laser welded 90 degree absorptive fitting and transmissive tube, in accordance with an example of the laser welding process.
Figure 13:
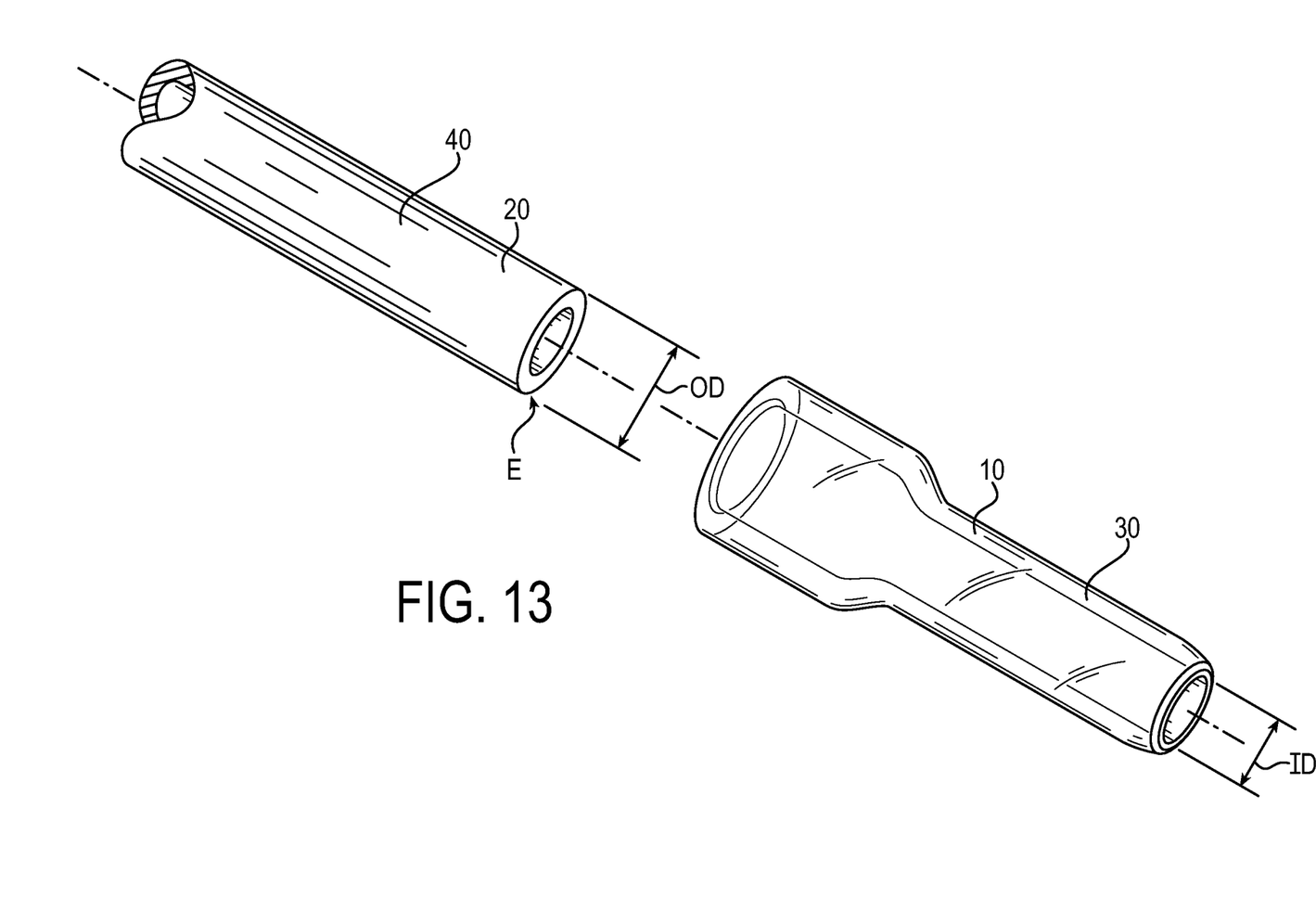
FIG. 13 is an exploded perspective view of a transmissive fitting and absorptive tube, in accordance with an example of the laser welding process.

With continuing reference to FIGS. 1, 3 and 13, in certain embodiments the transmissive component 10 has an inside diameter (ID) less than the outside diameter (OD) of the absorptive component 20. As shown, the fitting 30 has an inside diameter (ID) less than the outside diameter (OD) of the tube 40. In one embodiment, the ID of the of the fitting 30 may be 0.005-0.010 inch less than the OD of the tube 40. Before, or concurrently with, the attachment or assembly of the fitting 30 to the tube 40, the ID of the fitting 30 is expanded using known methods. In various embodiments, the ID of the fitting 30 may be expanded between 1% and 30% to optimize the compressive contact between the fitting 30 and the tube 40. The expanded ID of the fitting 30 is then at least partially inserted over an end (E) of the tube 40. The unique shape memory of PEX causes the ID of the fitting 30 to return to its original crosslinked shape which compresses the ID of the fitting 30 by way of a constant hoop stress around the OD of the tube 40. This compressive contact creates a mechanical bond between the fitting 30 and the tube 40. The fitting 30 and the tube 40 are subsequently laser welded, according to the following methods.

The laser is directed through the transmissive surface of the fitting 30 and onto the absorptive surface of the tube 40. In various embodiments, one of which is shown in FIG. 1, the laser passes through the transmissive component 10 and onto a designated laser band 50 located on the surface of the absorptive component 20, with the resulting thermal fusion bond being created between the transmissive component 10 and the absorptive component 20 at or about the laser band 50. Since the tube 40 is absorptive due to the carbon black, the surface of the tube 40 is heated and partially melts. This melting of the surface of the tube 40 also melts the adjoining surface of the fitting 30 due to the compressive contact (i.e. mechanical bond) between the two components. The melting of the surface of the tube 40 and the melting of the surface of the fitting 30 create a thermal fusion bond between the two components upon cooling. The cooling may be done by natural convection or other known cooling methods. Ultimately, a leak-proof connection is created through two separate bonds between the fitting 30 and the tube 40, a mechanical bond and a thermal fusion bond.

In other examples (shown in FIGS. 5, 6, 7 and 8), a fitting 30 is attached to a tube 40, similar to the above example, except that the fitting 30 is an absorptive component 20 that is at least partially inserted into an inside diameter (ID) of the tube 40 which comprises the transmissive component 10. In this embodiment, the fitting 30 is molded to its desired shape from polyethylene, where carbon black is added to the polyethylene to create an absorptive material which is not transmissive. The tube 40 is transmissive because it is formed by extrusion from non-colored polyethylene which is a transmissive material. As with the earlier examples, both the fitting 30 and the tube 40 may be separately crosslinked to form PEX, and may be crosslinked to the same, or different, percentages to optimize the shape memory and/or thermoset properties necessary for the creation of a thermal fusion bond between the two components during the laser welding process. As shown, the fitting 30 has an outside diameter (OD) greater than the inside diameter (ID) of the tube 40. Before, or concurrently with, the attachment of the fitting 30 to the tube 40, the ID of an end (E) of the tube 40 is expanded using known methods. In various embodiments, the ID of the tube 40 may be expanded between 1% and 30% to optimize the compressive contact between the tube 40 and the fitting 30. The expanded ID end of the tube 40 is then at least partially inserted over an end (E) of the fitting 30. The unique shape memory of PEX causes the ID of the tube 40 to return to its original crosslinked shape which compresses the ID of the end (E) of the tube 40 by way of a constant hoop stress around the OD of the fitting 30. This compressive contact creates a mechanical bond between the fitting 30 and the tube 40. The fitting 30 and the tube 40 are subsequently laser welded as follows.

The laser is directed through the transmissive surface of the tube 40 and onto the surface of the underlying fitting 30 (in some embodiments, at the laser band 50). Since the fitting 30 is absorptive due to the carbon black, the surface of the fitting 30 is heated and partially melts. This melting of the surface of the fitting 30 also melts the adjoining surface of the tube 40 due to the compressive contact between the two components. The melting of the surface of the fitting 30 and the melting of the surface of the tube 40 create a thermal fusion bond between the two components upon cooling. The cooling may be done by natural convection or other known cooling methods.

In one example, the laser used to weld the transmissive component and the absorptive component together has a wavelength of 980 nanometers with a range of 50-100 Watts. This strength of the laser is important as there must be enough melting of the components but not too much that will result in degradation of the components (such as creating a hole in the tube 40 or fitting 30). In other embodiments, the wattage may be in the range of 10-150 Watts depending on the specific material to be heated by the laser. The actual time the laser heats any one surface may be fractions of a second. The total time to laser the entire diameter of the assembled tube 40 and fitting 30, for example, may be approximately one (1) second. Due to the roundness of the tube 40 and/or fitting 30, mirrors may be employed in connection with a static laser to ensure a uniform application of the laser around the tube 40 and/or fitting 30. Alternatively, the tube 40 and/or fitting 30 may be rotated, or the laser itself may be rotated, to ensure uniform application of the laser to the tube 40 and/or fitting 30. The width of the laser beam may vary as well. In one example, the width of the laser may be approximately 1-5 mm. If a wider path is desired, the laser may be moved and rotated around a second time adjacent the first laser path to create a larger width. Any desired width may be created through additional rotations of the laser adjacent to the previous laser path to create a thermal fusion bond between the transmissive and absorptive components. Alternatively, staggered thermal fusion bonds may be created from non-adjacent laser paths.

Figure 9:
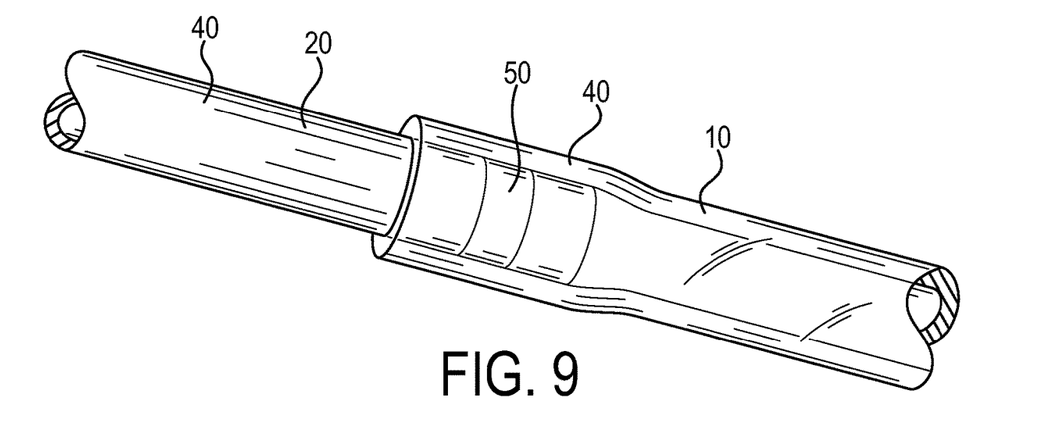
FIG. 9 is a perspective view of a laser welded absorptive tube and transmissive tube, in accordance with an example of the laser welding process.
Figure 10:
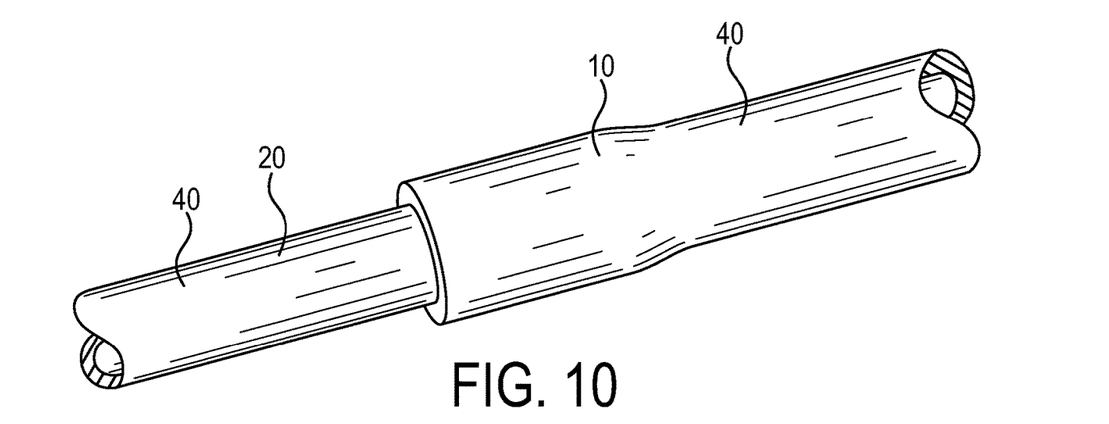
FIG. 10 is a perspective view of a laser welded absorptive tube and transmissive tube, in accordance with an example of the laser welding process.

Although the embodiments described above disclose either a transmissive fitting 30 assembled onto an absorptive tube 40, or a transmissive tube 40 assembled onto an absorptive fitting 30, it is also contemplated that thermal fusion bond connections can be made with a transmissive tube 40 partially assembled onto an absorptive tube 40 (FIGS. 9 and 10), or from a transmissive fitting 30 being assembled onto an absorptive fitting 30 (FIGS. 11 and 12), or as between a molded component to another molded component. In one example, the absorptive fitting 30 in FIG. 11 may be a plug which seals one of the ends or openings of the T-connector. In one embodiment, such as a T-connector or Y-connector, this molded component is overmolded onto a tube to create a leak proof connection between the tube and part of the T-connector or Y-connector, and another molded component is laser welded to another part of the T-connector or Y-connector to create another leak-proof connection. The process is similar to what has been described above where there must be transmissive component and an absorptive component which are laser welded after the components have been separately crosslinked. Additionally, and in alternative embodiments, only one component is crosslinked in order to utilize its shape memory properties for attaching the tube 40 to the fitting 30, or the fitting 30 to the tube 40. In other embodiments, a press fit connection may be used.

One of the benefits of the present process is the flexibility to be able to insert a fitting 30 on to the end of a tube 40 after the tube 40 has been pushed through a housing or some other type of structure, that otherwise would not be possible if the fitting 30 was already attached to the tube 30. The present process eliminates the need for overmolding the fitting 30 to the tube 40, or overmolding the tube 40 to the fitting 30, prior to crosslinking.

Another benefit of the present process is that the amount of bond required by the application can be achieved by adjusting the amount of interference between the two components and the amount of crosslinking in one or both of the parts. The greater the interference, for example the press fit, the better the bond. This is because the more interference would create a tighter compression contact, which will produce a stronger, more reliable thermal fusion weld. In the presence of heat, a thermoplastic will want to expand, and thus any laser welding of a thermoplastic will cause expansion of the components, which may result in a poor bond. However, crosslinked polyethylene, a thermoset, will want to return to its original crosslinked shape in the presence of heat resulting in a tighter compression fit between the components rather than expanding, which results in an improved bond.

In addition to polyethylene, there are many other known resins which are translucent and could be transmissive to an infrared laser. For example, nylon is translucent and can be crosslinked.

Figure 14:
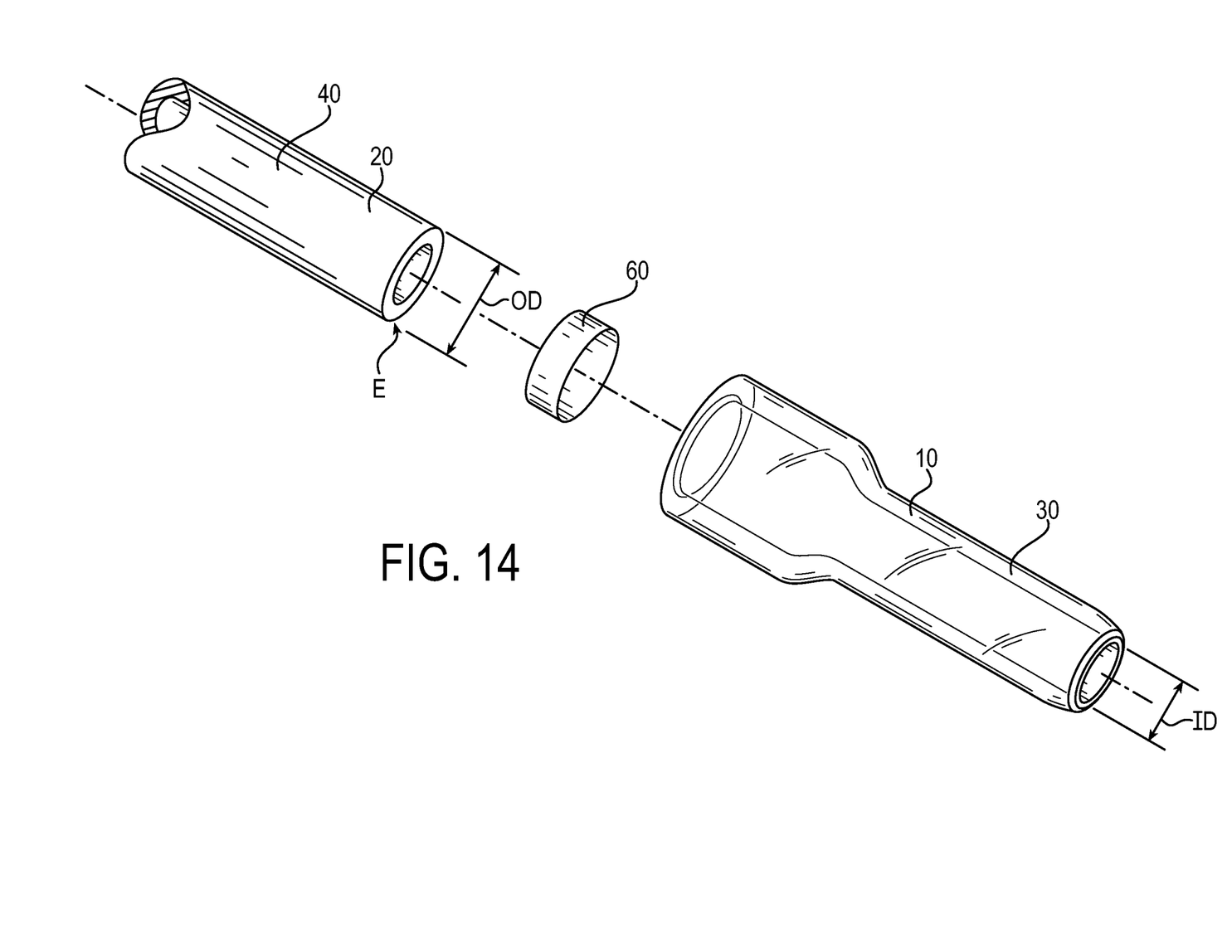
FIG. 14 is an exploded perspective view of a transmissive fitting and absorptive tube including a tie layer, in accordance with an example of the laser welding process.

In still another embodiment, two incompatible materials may be laser welded using a tie layer. In one example, a tube 40 and a fitting 30 are made from incompatible materials. As seen in an exploded view of FIG. 14, a tie layer 60 is inserted around the end of the tube 40. The tie layer 60 may be wrapped, sprayed or otherwise applied to the tube 30 or the fitting 40. After the tube 40 and the fitting 30 are attached, as described in a number of ways earlier, the two components are laser welded where the laser is directed at the tie layer, which melts the tie layer and bonds to both the tube 40 and fitting 30. This would allow the laser welding of two incompatible materials, such as plastic to metal, based on the appropriately chosen tie layer.

The mixture of carbon black to polyethylene creates an absorptive component as discussed above. In addition to the use of carbon black to create the absorptive feature for laser welding, other compounds and colors may be chosen. For example, dark colors may be chosen that will absorb the infrared laser.

It is also contemplated that additional crosslinking can be done after the initial crosslinking of the separate components as mentioned above. For example, in one non-limiting embodiment, a tube 40 may be initially crosslinked to 30% and then subsequently laser welded to a fitting 30. Next, the tube 40 is further formed (for example, by bending) to a specific shape for a particular plumbing application. After forming, the tube 40 is further crosslinked to obtain a higher crosslinking percentage and to retain its previously formed shape (i.e. the tube 40 will not want to straighten).

The laser welding of polyethylene and crosslinked polyethylene components can occur through various inventive processes which will now be disclosed. In one embodiment, a process for laser welding crosslinked polyethylene components may comprise one or more of the following steps: 1) providing a transmissive crosslinked polyethylene component and an absorptive crosslinked polyethylene component; 2) expanding an end of the transmissive crosslinked polyethylene component; 3) inserting an end of the absorptive crosslinked polyethylene component into the expanded end of transmissive crosslinked polyethylene component; 4) contracting the expanded end of the transmissive crosslinked polyethylene component using shape memory to form a compressive contact with the end of the absorptive crosslinked polyethylene component; and 5) directing a laser beam through the transmissive crosslinked polyethylene component onto an outer surface of the absorptive crosslinked polyethylene component, wherein the step of contracting the expanded end of the transmissive crosslinked polyethylene component using shape memory creates a mechanical bond between the transmissive crosslinked polyethylene component and the absorptive crosslinked polyethylene component, and the step of directing a laser beam creates a thermal fusion bond between the transmissive crosslinked polyethylene component and the absorptive crosslinked polyethylene component.

In certain embodiments of this method, the transmissive crosslinked polyethylene component may be either a tube or a fitting. In one embodiment, the process may include the laser welding of a transmissive crosslinked polyethylene fitting with an absorptive crosslinked polyethylene tube. In another embodiment of this method, the process may include the laser welding of a transmissive crosslinked polyethylene tube with an absorptive crosslinked polyethylene fitting. In still other embodiments, the process may include the laser welding of a transmissive crosslinked polyethylene fitting with an absorptive crosslinked polyethylene fitting, or the laser welding of a transmissive crosslinked polyethylene tube with an absorptive crosslinked polyethylene tube.

In some versions of the inventive process, the transmissive crosslinked polyethylene component is translucent, while in others it is transparent. In other versions, the crosslinked polyethylene component is neither transparent nor translucent, but is still transmissive. In one method, the laser welding process utilizes an absorptive crosslinked polyethylene component that includes carbon black.

The process for laser welding crosslinked polyethylene components may include a laser beam with a wavelength of 980 nanometers and a range of between 50 and 100 Watts. In certain embodiments, the laser beam is rotated around an entire circumference of the transmissive crosslinked polyethylene component in approximately one second. The process for laser welding crosslinked polyethylene components may create a thermal fusion bond at a laser band that is between 1 and 5 millimeters in width. In other embodiments, the wattage may be in the range of between 15 and 150 Watts.

In another embodiment, a process for laser welding polyethylene components may comprise one or more of the following steps: 1) providing a transmissive polyethylene component and an absorptive polyethylene component; 2) expanding an end of the transmissive polyethylene component; 3) inserting an end of the absorptive component into the expanded end of the transmissive polyethylene component; contracting the expanded end of the transmissive polyethylene component using shape memory to form a compressive contact with the end of the absorptive component; 4) directing a laser beam through the transmissive polyethylene component onto an outer surface of the absorptive polyethylene component; and 5) crosslinking the transmissive polyethylene component and the absorptive polyethylene component, wherein the step of contracting the expanded end of the transmissive component using shape memory creates a mechanical bond between the transmissive polyethylene component and the absorptive component, wherein the step of directing a laser beam creates a thermal fusion bond between the transmissive component and the absorptive component.

In related embodiments of this process, the transmissive polyethylene component may be either a tube or a fitting. In one embodiment, the process may include the laser welding of a transmissive polyethylene fitting with an absorptive polyethylene tube. In another embodiment of this method, the process may include the laser welding of a transmissive polyethylene tube with an absorptive polyethylene fitting. In still other embodiments, the process may include the laser welding of a transmissive polyethylene fitting with an absorptive polyethylene fitting, or the laser welding of a transmissive polyethylene tube with an absorptive polyethylene tube.

In some versions of the inventive process, the transmissive polyethylene component is translucent, while in others it is transparent. In other versions, the polyethylene component is neither transparent nor translucent, but is still transmissive. In one method, the laser welding process utilizes an absorptive polyethylene component that includes carbon black.

The process for laser welding polyethylene components may include a laser beam with a wavelength of 980 nanometers and a range of between 50 and 100 Watts. In certain embodiments, the laser beam is rotated around an entire circumference of the transmissive polyethylene component in approximately one second. The process for laser welding polyethylene components may create a thermal fusion bond at a laser band that is between 1 and 5 millimeters in width.

The realization of this invention can take many forms. While this invention has been described with reference to examples thereof, it shall be understood that such description is by way of illustration only and should not be construed as limiting the scope of the claimed examples. Accordingly, the scope and content of the examples are to be defined only by the terms of the following claims. Furthermore, it is understood that the features of any example discussed herein may be combined with one or more features of any one or more examples otherwise discussed or contemplated herein unless otherwise stated.

What is claimed is:

1. A process for laser welding crosslinked polyethylene components, comprising the following steps:
   providing a transmissive crosslinked polyethylene component;
   providing an absorptive crosslinked polyethylene component;
   expanding an end of the transmissive crosslinked polyethylene component;
   inserting an end of the absorptive crosslinked polyethylene component into the expanded end of transmissive crosslinked polyethylene component;
   contracting the expanded end of the transmissive crosslinked polyethylene component using shape memory to form a compressive contact with the end of the absorptive crosslinked polyethylene component; and
   directing a laser beam through the transmissive crosslinked polyethylene component onto an outer surface of the absorptive crosslinked polyethylene component,
   wherein the step of contracting the expanded end of the transmissive crosslinked polyethylene component using shape memory creates a mechanical bond between the transmissive crosslinked polyethylene component and the absorptive crosslinked polyethylene component,
   wherein the step of directing a laser beam creates a thermal fusion bond between the transmissive crosslinked polyethylene component and the absorptive crosslinked polyethylene component.

2. The process for laser welding crosslinked polyethylene components of claim 1, wherein the transmissive crosslinked polyethylene component is a tube.

3. The process for laser welding crosslinked polyethylene components of claim 1, wherein the transmissive crosslinked polyethylene component is a fitting.

4. The process for laser welding crosslinked polyethylene components of claim 1, wherein the transmissive crosslinked polyethylene component is a fitting and the absorptive crosslinked polyethylene component is a tube.

5. The process for laser welding crosslinked polyethylene components of claim 1, wherein the transmissive crosslinked polyethylene component is a tube and the absorptive crosslinked polyethylene component is a fitting.

6. The process for laser welding crosslinked polyethylene components of claim 1, wherein both the transmissive crosslinked polyethylene component and the absorptive crosslinked polyethylene component are tubes.

7. The process for laser welding crosslinked polyethylene components of claim 1, wherein both the transmissive crosslinked polyethylene component and the absorptive crosslinked polyethylene component are fittings.

8. The process for laser welding crosslinked polyethylene components of claim 1, wherein the absorptive component is crosslinked to a greater percentage than the transmissive component.

9. The process for laser welding crosslinked polyethylene components of claim 1, wherein the absorptive component is crosslinked to the same percentage than the transmissive component.

10. The process for laser welding crosslinked polyethylene components of claim 1, wherein the absorptive crosslinked polyethylene component includes carbon black.

11. The process for laser welding crosslinked polyethylene components of claim 1, wherein the laser beam creates a thermal fusion bond at a laser band that is between 1 and 5 millimeters in width.

12. A process for laser welding polyethylene components, comprising the following steps:
   providing a transmissive polyethylene component;
   providing an absorptive polyethylene component;
   expanding an end of the transmissive polyethylene component;
   inserting an end of the absorptive component into the expanded end of transmissive polyethylene component;
   contracting the expanded end of the transmissive polyethylene component using shape memory to form a compressive contact with the end of the absorptive component;
   directing a laser beam through the transmissive polyethylene component onto an outer surface of the absorptive polyethylene component; and
   crosslinking the transmissive polyethylene component and the absorptive polyethylene component,
   wherein the step of contracting the expanded end of the transmissive component using shape memory creates a mechanical bond between the transmissive polyethylene component and the absorptive component,
   wherein the step of directing a laser beam creates a thermal fusion bond between the transmissive component and the absorptive component.

13. The process for laser welding polyethylene components of claim 12, wherein the transmissive polyethylene component is a tube.

14. The process for laser welding polyethylene components of claim 12, wherein the transmissive polyethylene component is a fitting.

15. The process for laser welding polyethylene components of claim 12, wherein the transmissive polyethylene component is a fitting and the absorptive polyethylene component is a tube.

16. The process for laser welding polyethylene components of claim 12, wherein the transmissive polyethylene component is a tube and the absorptive polyethylene component is a fitting.

17. The process for laser welding polyethylene components of claim 12, wherein both the transmissive polyethylene component and the absorptive polyethylene component are tubes.

18. The process for laser welding polyethylene components of claim 12, wherein both the transmissive polyethylene component and the absorptive polyethylene component are fittings.

19. The process for laser welding polyethylene components of claim 12, wherein the absorptive polyethylene component includes carbon black.

20. The process for laser welding polyethylene components of claim 12, wherein the laser beam creates a thermal fusion bond at a band that is between 1 and 5 millimeters in width.

* * * * *